(12) United States Patent     (10) Patent No.: US 9,446,625 B2
Huusmann     (45) Date of Patent: Sep. 20, 2016

(54) COMBINATION OF A WHEEL CENTER CAP AND A HUB CENTERING RING

(71) Applicant: East Scandic A/S, Vedbæk (DK)

(72) Inventor: Casper Huusmann, Vedbæk (DK)

(73) Assignee: East Scandic A/S, Vedbaek (DK)

( * ) Notice: Subject to any disclaimer, the term of this patent is extended or adjusted under 35 U.S.C. 154(b) by 0 days.

(21) Appl. No.: 14/431,384

(22) PCT Filed: Sep. 19, 2013

(86) PCT No.: PCT/EP2013/002831
§ 371 (c)(1),
(2) Date: Mar. 26, 2015

(87) PCT Pub. No.: WO2014/048551
PCT Pub. Date: Apr. 3, 2014

(65) Prior Publication Data
US 2015/0224819 A1     Aug. 13, 2015

(30) Foreign Application Priority Data
Sep. 27, 2012 (DK) ................................ 2012 00589

(51) Int. Cl.
*B60B 25/00* (2006.01)
*B60B 7/08* (2006.01)
(Continued)

(52) U.S. Cl.
CPC . *B60B 7/08* (2013.01); *B60B 3/14* (2013.01); *B60B 3/16* (2013.01); *B60B 7/00* (2013.01);
(Continued)

(58) Field of Classification Search
CPC ............. B60B 7/04; B60B 7/02; B60B 7/06; B60B 7/061; B60B 7/063; B60B 7/08; B60B 7/0013; B60B 3/16; B60B 3/14; B60B 3/147; B60B 7/00; B60B 7/065; B60B 7/066; B60B 29/001
USPC .............. 301/35.627, 37.101, 37.102, 37.28, 301/37.31, 37.34, 37.39, 37.106, 108.1
See application file for complete search history.

(56) References Cited

U.S. PATENT DOCUMENTS 4,040,672 A * 8/1977 Imahashi .................. B60B 7/14
                                                220/233
4,067,621 A * 1/1978 Reppert .................... B60B 7/00
                                                301/108.3
(Continued)

*Primary Examiner* — Hau Phan
*Assistant Examiner* — Jacob Meyer
(74) *Attorney, Agent, or Firm* — K. David Crockett, Esq.; Nicky Economy Syrengelas, Esq.; Crockett & Crockett, PC

(57) ABSTRACT

There is provided a combination of a center cap and a hub centering ring for wheel rims with a center bore. The combination comprises a wheel center cap having a body portion with a front side and a rear side and a plurality of flexibly resilient fingers extending substantially orthogonal from the rear side of the body portion, where each or at least part of the fingers having a free end with a flange or stepped portion. The combination further comprises a hub centering ring with a rear end, a front end, an interior surface and an outer surface. A radially outwardly turned retainer or retainer flange is provided at the rear end for retaining the ring in axial spaced relationship relative to the center bore of a wheel rim, and a recessed groove is provided at the interior or outer surface at a distance from the front end. The recessed groove is dimensioned and arranged for receipt of the flange or stepped portion of the fingers of the center cap to thereby retain the center cap in concentric relationship with the centering ring. In one embodiment, the flange or stepped portion of the fingers of the wheel center cap is radially outwardly turned, and the recessed groove is provided at the interior surface of the hub centering ring. In another embodiment, the flange or stepped portion of the fingers of the wheel center cap is radially inwardly turned, and the recessed groove is provided at the outer surface of the hub centering ring.

10 Claims, 7 Drawing Sheets

(51) Int. Cl.
  *B60B 3/14* (2006.01)
  *B60B 7/00* (2006.01)
  *B60B 7/06* (2006.01)
  *B60B 3/16* (2006.01)
  *B60B 7/02* (2006.01)
  *B60B 7/04* (2006.01)

(52) U.S. Cl.
  CPC .............. *B60B 7/0013* (2013.01); *B60B 7/02* (2013.01); *B60B 7/06* (2013.01); *B60B 7/061* (2013.01); *B60B 7/04* (2013.01); *B60B 2310/307* (2013.01); *B60B 2360/30* (2013.01); *B60B 2900/112* (2013.01); *B60Y 2200/11* (2013.01)

(56) References Cited

U.S. PATENT DOCUMENTS

| | | | | |
|---|---|---|---|---|
| 4,235,476 A * | 11/1980 | Arvidsson | | B60B 7/04 301/108.1 |
| 4,544,209 A * | 10/1985 | Braungart | | B60B 7/04 301/108.5 |
| RE32,903 E * | 4/1989 | Braungart | | B60B 7/14 301/108.5 |
| 5,112,112 A * | 5/1992 | Baba | | B60B 7/08 301/108.3 |
| 5,150,949 A * | 9/1992 | Wang | | B60B 7/04 301/37.371 |
| 5,234,260 A * | 8/1993 | Coombes, Jr. | | B60B 7/04 301/108.1 |
| 5,362,134 A * | 11/1994 | Carmona | | B60B 3/008 301/105.1 |
| 5,636,906 A * | 6/1997 | Chase | | B60B 1/08 301/37.11 |
| 5,887,952 A * | 3/1999 | Gandellini | | B60B 3/02 301/35.58 |
| 6,039,406 A * | 3/2000 | Sheu | | B60B 7/00 301/108.4 |
| 6,206,479 B1 * | 3/2001 | Jackman | | B60B 7/0013 301/108.1 |
| 6,443,531 B1 * | 9/2002 | Hogan | | B60B 7/0053 301/37.34 |
| 6,758,531 B1 * | 7/2004 | Bullard | | B60B 3/16 301/108.4 |
| 6,857,708 B2 * | 2/2005 | Hartl | | B60B 7/04 301/108.1 |
| 6,969,124 B2 * | 11/2005 | Gerard | | B60B 7/0013 301/108.1 |
| 6,983,999 B2 * | 1/2006 | Goettker | | B60B 7/002 301/108.1 |
| 7,651,171 B2 * | 1/2010 | Kinslow | | B60B 7/10 301/108.1 |
| 8,764,120 B2 * | 7/2014 | Scicluna | | B60B 1/006 301/100 |
| 8,851,577 B2 * | 10/2014 | Onishi | | B60B 7/08 301/108.1 |
| 9,150,047 B2 * | 10/2015 | Noriega | | B60B 1/06 |
| 9,242,506 B2 * | 1/2016 | Bennett | | B60B 7/0013 |
| 2003/0001430 A1 * | 1/2003 | Wang | | B60B 7/0013 301/108.4 |
| 2004/0075335 A1 * | 4/2004 | Hartl | | B60B 7/04 301/108.1 |
| 2004/0145236 A1 * | 7/2004 | Wang | | B60B 7/02 301/37.101 |
| 2007/0228807 A1 * | 10/2007 | Leslie | | B60B 7/0013 301/37.26 |
| 2011/0062771 A1 * | 3/2011 | Capuzzi | | B60B 7/0013 301/108.1 |
| 2014/0152078 A1 * | 6/2014 | Noriega | | B60B 1/06 301/37.26 |
| 2014/0167491 A1 * | 6/2014 | Karashima | | B60B 7/00 301/37.102 |

* cited by examiner

COMBINATION OF A WHEEL CENTER CAP AND A HUB CENTERING RING

FIELD OF THE INVENTION

The present invention relates to the field of hub centering rings for wheel rims, and in particular to a combination of a wheel center cap and a hub centering ring.

BACKGROUND OF THE INVENTION

Concentric mounting of wheels on vehicle hubs have long been in concern in the marketplace. Much concern has been given to the concentric mounting of automotive wheels on the automotive hubs so as to minimize vibration of the wheels in operation and add to the comfort of the passenger.

Different brand of cars use different sized hub centers. To get around this problem, the aftermarket wheel makers may drill their wheels for the biggest possible hub center, so that their wheels can fit on the largest possible variety of cars. The problem is that if the center hole is too big, the wheels won't center on the hub properly, and the drive my get unwanted vibrations. To deal with this problem, the wheel manufacturer make plastic hub centering rings that adapt those center holes to different brands of cars, so that the wheels center on the hubs properly. It is much cheaper to produce and store one wheel and a dozen different plastic centering rings to adapt a wheel to different cars than it is to produce and store a dozen different wheels.

For both aluminum and steel wheel rims, the known hub centering rings have a retaining flange on the rear side in order to hold the centering rings in the right position relative to the center bore of the wheel rim. For aluminum rims, the rims have a thickness and are formed so that the vehicle hub is totally covered by the rim, and a center cap is usually provided, which center cap can be secured directly on the rim without engaging or touching the vehicle hub. However, steel rims are thinner than aluminum rims and do not cover the whole vehicle hub, and when a steel rim is mounted to the vehicle hub, a part of the hub protrudes though the center hole of the rim, and there is no room for securing a small center cap directly to the steel rim. Wheel covers covering the whole rim are available for steel rims, which wheel covers are secured along the periphery of the rim, but there is need for a steel rim center cap of reduced size, which can cover the protruding vehicle hub without covering the whole rim.

The combination of a center cap and a hub centering ring according to the present invention provides a cost effective solution to this problem.

SUMMARY OF THE INVENTION

According to the present invention there is provided a combination of a center cap and a hub centering ring for wheel rims with a center bore, said combination comprising:
  a wheel center cap having a body portion with a front side and a rear side and a plurality of flexibly resilient fingers extending substantially orthogonal from the rear side of the body portion, each or at least part of the fingers having a free end with a flange or stepped portion; and
  a hub centering ring with a rear end, a front end, an interior surface and an outer surface, wherein a radially outwardly turned retainer or retainer flange is provided at the rear end for retaining the ring in axial spaced relationship relative to the center bore of a wheel rim, and wherein a recessed groove is provided at the interior or outer surface at a distance from the front end, said groove being dimensioned and arranged for receipt of the flange or stepped portion of the fingers of the center cap to thereby retain the center cap in concentric relationship with the centering ring.

According to a first embodiment of the invention, the flange or stepped portion of the fingers of the wheel center cap is radially outwardly turned, and the recessed groove is provided at the interior surface of the hub centering ring.

According to a second embodiment of the invention, the flange or stepped portion of the fingers of the wheel center cap is radially inwardly turned, and the recessed groove is provided at the outer surface of the hub centering ring.

It is preferred that the resilient fingers are circular arranged at the rear side of the body portion of the center cap, and that the recessed groove at the surface of the centering ring is a circular groove. Here, for embodiments where the stepped portion of the fingers is radially outwardly turned, the outer diameter of the flange or stepped portion part of the center cap fingers may be substantially equal to the diameter of the recessed groove of the centering ring. For embodiments where the stepped portion of the fingers is radially inwardly turned, the inner diameter of the flange or stepped portion part of the center cap fingers may be substantially equal to the diameter of the recessed groove of the centering ring.

It is within one or more embodiments of the invention that the lower part of the flange or stepped portion of the center cap fingers is provided at a first distance from the rear side of the body portion, and that the recessed groove of the centering ring has an upper edge or front edge provided at a second distance from the front end of the centering ring with the second distance being substantially equal to or smaller than the first distance.

The present invention also covers embodiments wherein a wheel hub recess is provided at the rear end part of the interior surface of the centering ring, whereby the inner diameter of the centering ring is larger at the recessed rear end part than in the non-recessed middle part of the centering ring.

It is preferred that the wheel center cap has a generally disc-like body portion, and it is within an embodiment of the invention that the body portion of the wheel center cap comprises a front side portion and a rear side portion with the fingers extending from the rear side portion, and with the front side portion being generally disc-like shaped with an outer diameter being larger that the outer diameter of the center cap fingers.

According to an embodiment of the invention the combination may further comprise a wheel rim with a center bore, where the height of the hub centering ring is larger than the length or height of the center bore, whereby the front end part of the centering ring is projecting at the front of the wheel rim when the centering ring is arranged within the center bore with the retainer flange engaging the rear part of the wheel rim. The wheel rim may have a number of bolt holes surrounding the center bore, and the outer diameter of the disc-like shaped front side portion of the center cap may be larger than the diameter of a circle encompassing the outermost arranged bolt holes.

It is within an embodiment of the invention that the wheel rim is made of steel.

It is preferred that the wheel center cap and the hub centering ring are made of a plastic material, such as a Polycarbonate material. However, the invention also covers an embodiment wherein the hub centering ring is made of aluminum, and wherein the wheel center cap is made of a plastic material, such as a Polycarbonate material.

DETAILED DESCRIPTION OF THE INVENTION

Figure 1:
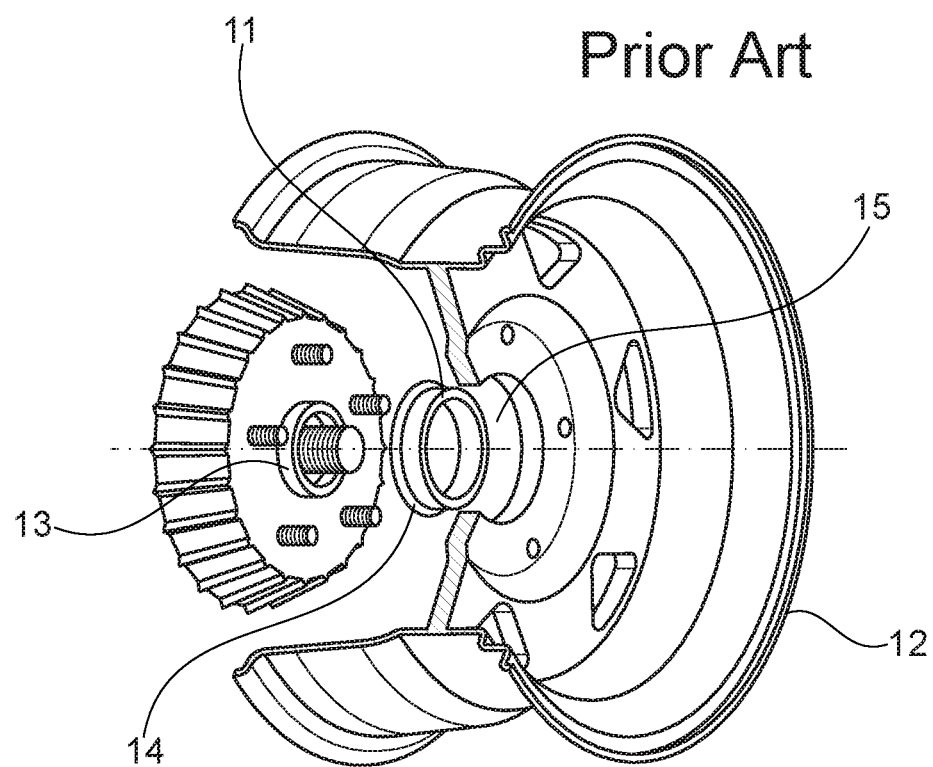
FIG. 1 is a sectional view illustrating a prior system with a wheel rim and a hub centering ring.

FIG. 1 is a sectional view illustrating a prior art system, in which a hub centering ring 11 is arranged between a wheel rim 12 and the hub 13 of a vehicle. The hub centering ring 11 has a retaining flange 14 on the rear side in order to hold the centering ring 11 in the right position relative to the center bore 15 of the wheel rim 12. For aluminum rims, the rim 12 may have a thickness and are formed so that the vehicle hub 13 is totally covered by the rim 12. For the rim in FIG. 1, there is not shown any center cap, but for an aluminum rim a center cap can be secured directly on the rim 12 without engaging or touching the vehicle hub 13. However, steel rims are thinner than aluminum rims and may not cover the whole vehicle hub 13, so that a part of the hub may protrude though the center hole of the rim, and there is no room for securing a small center cap directly to the steel rim.

Figure 2A:
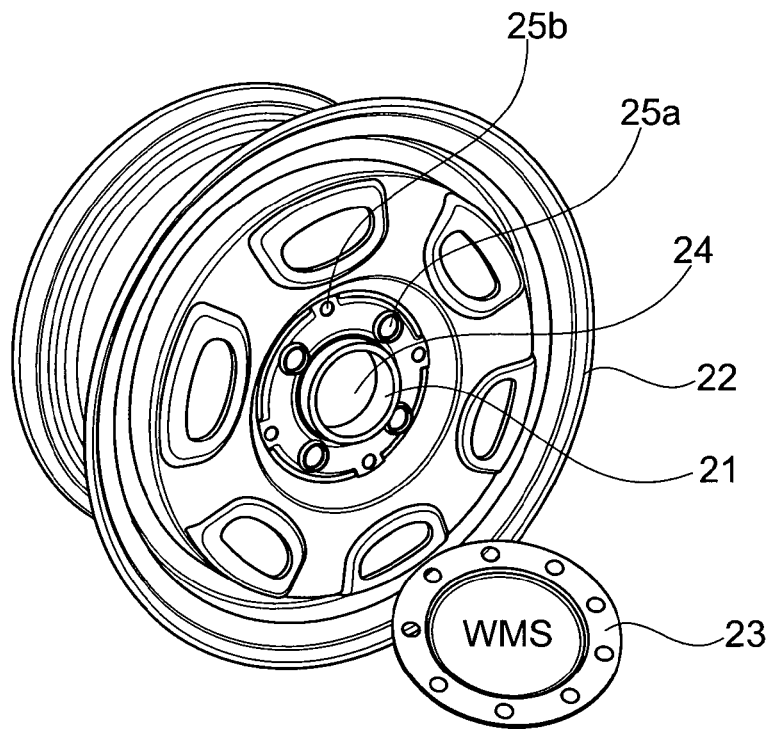
FIGS. 2a and 2b illustrate the arrangement of a wheel rim of a combination of a center cap and a hub centering ring according to the present invention.
Figure 2B:
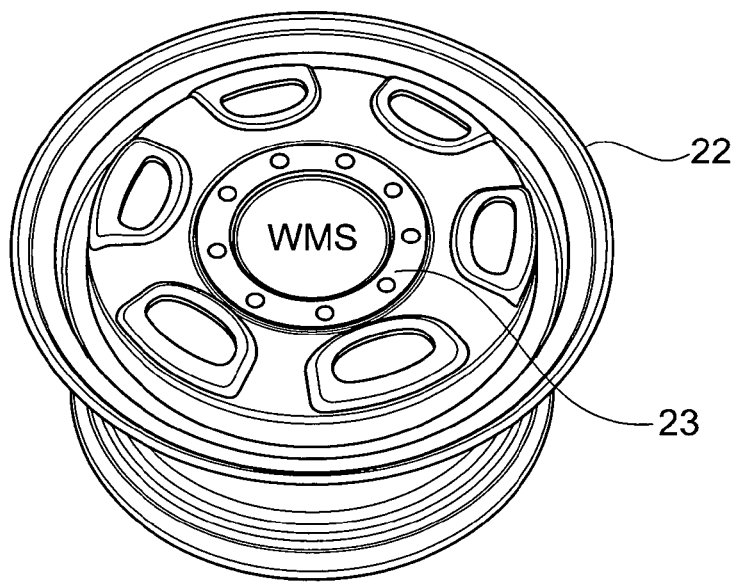

FIGS. 2a and 2b illustrate the arrangement on a wheel rim 22 of a combination of a center cap 23 and a hub centering ring 21 according to the present invention. The center cap 23 has a generally disc-like shaped front portion. The wheel rim 22 has a center bore 24, and the height of the hub centering ring 21 is larger than the height of the center bore 24. The centering ring 21 is arranged within the center bore 24 with the retainer flange engaging the rear part of the wheel rim (not shown in the figure), and the front end part of the centering ring 21 is projecting at the front of the wheel rim 22. The wheel rim 22 has a number of bolt holes 25 surrounding the center bore 24, and the outer diameter of the disc-like shaped front side portion of the center cap 23 is larger than the diameter of a circle encompassing the outermost arranged bolt holes 25. In FIG. 2b the center cap 23 is connected to the centering ring 21, and the front side portion of the center cap 23 is covering the bolt holes 25. The rim 22 on FIG. 2a has a number of first bolt holes 25a arranged closest to the center bore 24, and a number of second bolt holes 25b arranged further away from the center bore 24. By having both the first and second bolt holes 25a, 25b, the rim 22 can be used for different car models, and by connecting the center cap 23 to the centering ring 21, the front portion of the center cap 23 covers the different bolt holes 25a, 25b. The combination of a center cap 23 and a hub centering ring 21 according to the present invention may be designed and used for both aluminum rims and steel rims, but it is preferred that the center cap 23 and the hub centering ring are designed for use with steel rims.

Figures 3A, 3B:
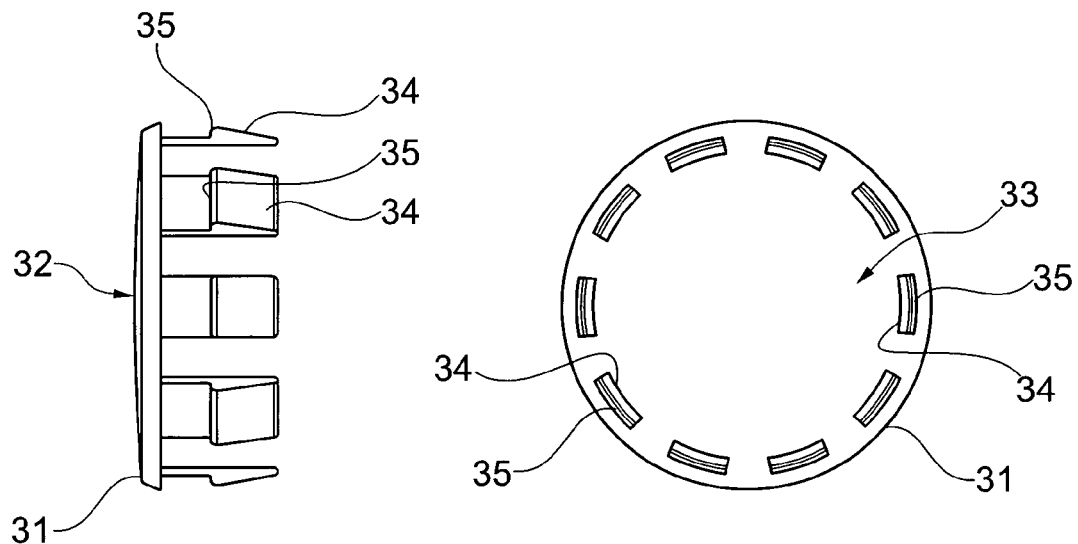
FIGS. 3a and 3b show a center cap for use in a combination according to the present invention.

FIGS. 3a and 3b show a first embodiment of a wheel center cap 31 for use in a combination according to the present invention. The center cap 31 has a body portion with a front side 32 and a rear side 33 and a plurality of flexibly resilient fingers 34 extending substantially orthogonal from the rear side 33 of the body portion, each or at least part of the fingers having a free end with a radially outwardly turned flange or stepped portion 35. The resilient fingers 34 are circular arranged at the rear side 33 of the body portion of the center cap 31.

Figure 4:
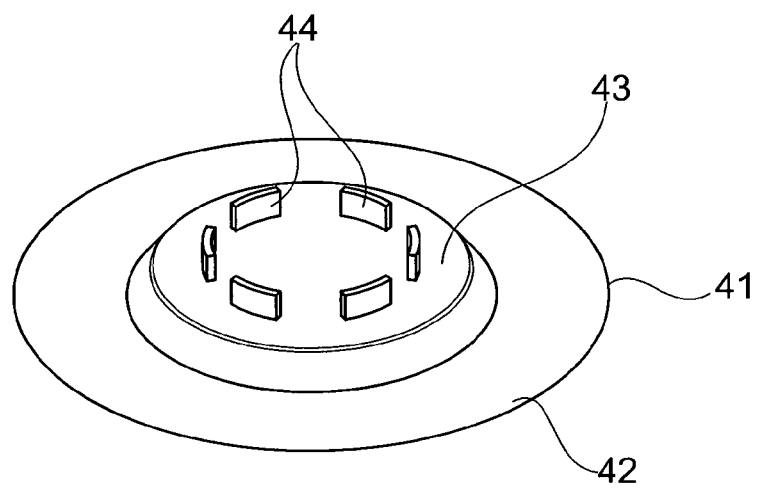
FIG. 4 shows a preferred embodiment of a center cap for use in a combination according to the present invention.

FIG. 4 illustrates a second and preferred embodiment of a center cap 41 for use in a combination according to the present invention. Also here, the center cap 41 has a body portion with a front side 42 and a rear side 43 and a plurality of flexibly resilient fingers 44 extending substantially orthogonal from the rear side 43 of the body portion. The fingers 44 are similar to the fingers 34 shown in details in FIGS. 3a and 3, and the fingers 44 also has a free end with a radially outwardly turned flange or stepped portion (not shown in FIG. 4). The center cap 41 of FIG. 4 has a generally body portion, where the front side portion 42 is generally disc-like shaped with an outer diameter being larger that the outer diameter of a circle encompassing the flange or stepped portion part of the center cap fingers 44. The center cap 41 may be similar to the center cap 23 shown in FIGS. 2a and 2b, and it is preferred that the outer diameter of the front side portion 42 is larger than the diameter of a circle encompassing the outermost arranged bolt holes 25b of the rim 22, for which the center cap 41 is to be used.

Figure 5A:
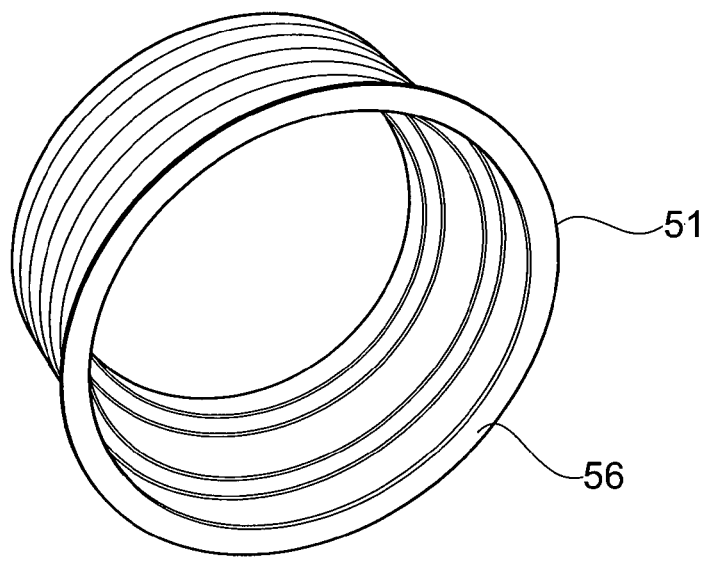
FIGS. 5a and 5b illustrate an embodiment of a hub centering ring for use in a combination according to the present invention.
Figure 5B:
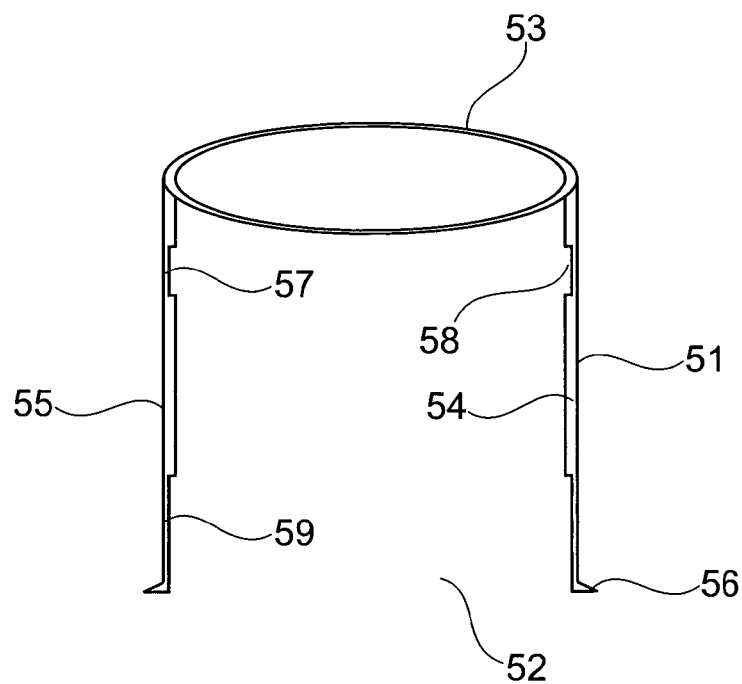

FIGS. 5a and 5b illustrate an embodiment of a hub centering ring 51 for use in a combination according to the present invention. The hub centering ring 51 may be used in combination with the center cap 31 of FIGS. 3a, 3b or the center cap 41 of FIG. 4. The centering ring 51 has a rear end 52, a front end 53, an interior surface 54 and an outer surface 55. A radially outwardly turned retainer or retainer flange 56 is provided at the rear end 52 for retaining the ring 51 in axial spaced relationship relative to the center bore 24 of a wheel rim 22, and a recessed groove 57 is provided at the interior surface 54 at a distance from the front end 53. The resilient fingers 34, 44 of the center cap 31, 41 are circular arranged at the rear side of the body portion of the center cap 31, 41, and the recessed groove 57 of the centering ring is 51 a circular groove. The groove 57 is dimensioned and arranged for receipt of the flange or stepped portion 35 of the fingers 34, 44 of the center cap 31, 41 to thereby retain the center cap 31, 41 in concentric relationship with the centering ring 51. Thus, the outer diameter of the flange or stepped portion part 35 of the center cap fingers 34, 44 may be substantially equal to the inner diameter of the recessed groove 57 of the centering ring 51. The lower part of the flange or stepped portion 35 of the center cap fingers 34, 44 is provided at a first distance from the rear side of the body portion of the center cap 31, 41, and the recessed groove 57 of the centering ring 51 has an upper edge or front edge 58 provided at a second distance from the front end 53 of the centering ring 51, and this second distance must not be larger than the first distance in order for the flange part of the fingers 34, 44 to fit into the groove 57, and it is preferred that the second and first distances are substantially equal.

The centering ring 51 has a wheel hub recess 59 at the rear end part of the interior surface 54. Thus, the inner diameter of the centering ring 51 is larger at the recessed rear end part 59 than in the non-recessed middle part of the centering ring 51. Apart from the flange part 56 at the rear end 52, the centering ring 51 has a constant outer diameter along the outer surface 55.

Figure 8:
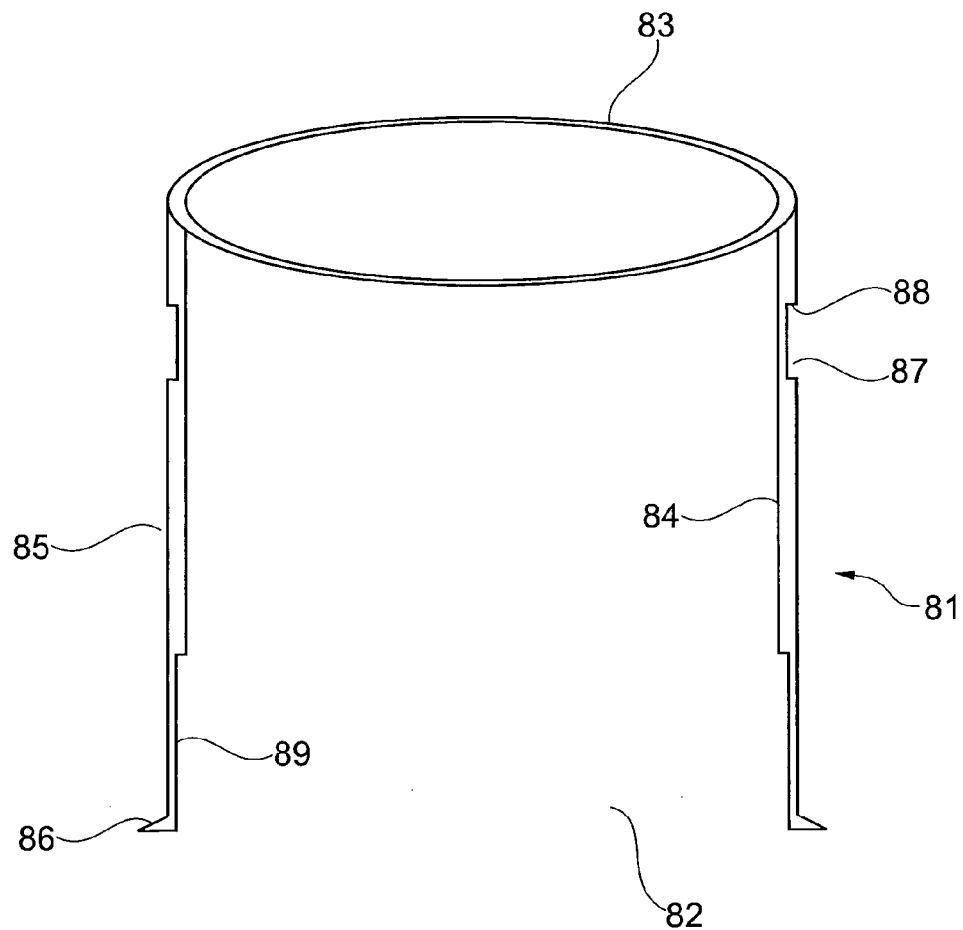
FIG. 8 shows an embodiment of a hub centering ring for use in an alternative combination according to the present invention.

FIG. 8 shows an embodiment of a hub centering ring 81 for use in an alternative combination according to the present invention. The centering ring 81 of FIG. 8 is identical to the centering ring 51 of FIGS. 5a and 5b with the exception that the recessed circular groove 87 for receiving the fingers of a center cap is formed at the outer surface of the centering ring 81. The hub centering ring 81 may be used in combination with center caps almost equal to the center caps 31 of FIGS. 3a, 3b or the center cap 41 of FIG. 4, with the exception that the flange or stepped portion of the fingers of the wheel center cap is radially inwardly turned in order to be received in the groove 87, which is at the outer surface of the centering ring 81. The groove 87 is dimensioned and arranged for receipt of the radially inwardly turned flange or stepped portion of the fingers of a corresponding center cap to thereby retain the center cap in concentric relationship with the centering ring 81. Thus, the inner diameter of the flange or stepped portion part of the corresponding center cap fingers may be substantially equal to the inner diameter of the recessed groove 87 of the centering ring 81. The recessed groove 87 has an upper edge or front edge 88 provided at a second distance from the front end 83 of the centering ring 81, and this second distance must not be larger than the distance between the rear side of the body portion to the lower part of the stepped portion of the fingers of the corresponding center cap.

The centering ring 81 if FIG. 8 also has a retainer flange 86 at the rear end 82 and a wheel hub recess 89 at the rear end part of the interior surface 84. Apart from the groove 87 and the flange part 86, the centering ring 81 has a constant outer diameter along the outer surface 85.

Figure 6:
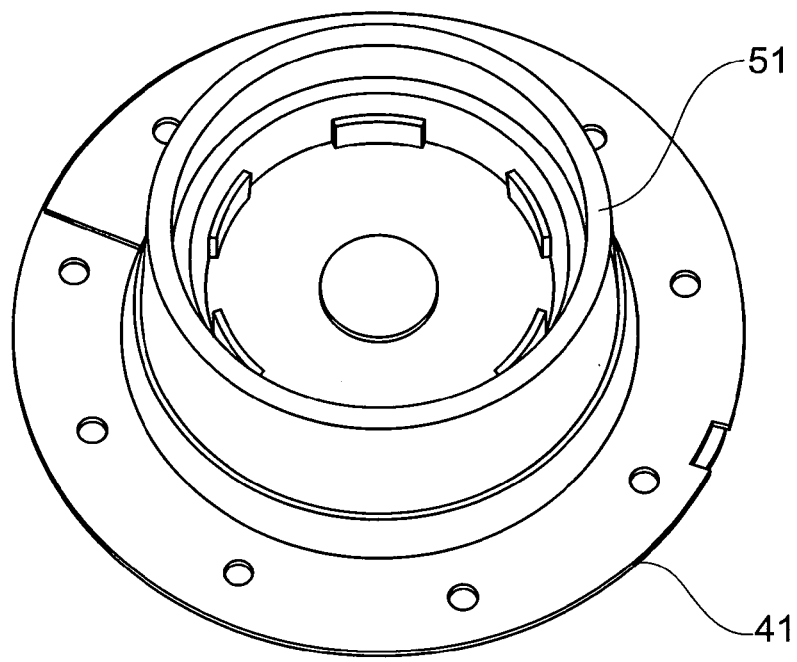
FIG. 6 shows the centering ring of FIG. 5 connected to the center cap of FIG. 4.
Figure 7:
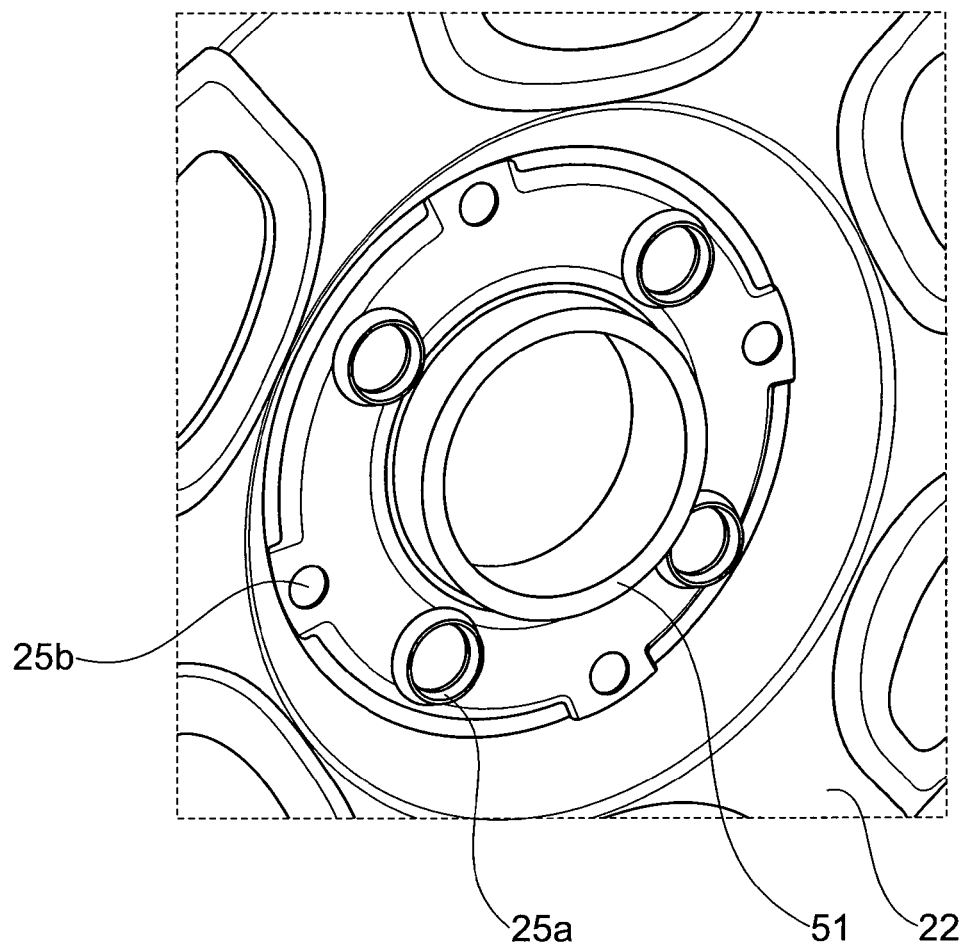
FIG. 7 is a more detailed view of the arrangement of the hub centering ring of FIG. 5 within the wheel rim of FIG. 2.

FIG. 6 shows the centering ring 51 of FIG. 5 connected to the center cap 41 of FIG. 4, with the flange portion of the fingers 44 received within the groove 57 of the centering ring 51. However, in real use the centering ring 51 and the center cap are to be connected to each other with the centering ring 51 arranged at the center bore 24 of a rim 22. The arrangement of the centering ring 51 at a wheel rim 22 is shown in detail in FIG. 7.

The hub centering ring 51 can be made of different materials such as aluminum or a plastic material, while the wheel center cap 31, 41 should be mad of a plastic material. It is preferred that both the wheel center cap 31, 41 and the hub centering ring 51 are made of a plastic material, such as a Polycarbonate material.

The invention claimed is:

1. A combination of a center cap and a hub centering ring for wheel rims with a center bore, said combination comprising:
   a wheel center cap having a body portion with a front side and a rear side and a flexibly resilient part extending substantially orthogonal from the rear side of the body portion, each or at least part of the resilient part having a free end with a flange or stepped portion; and
   a hub centering ring with a rear end, a front end, an interior surface and an outer surface, wherein a radially outwardly turned retainer or retainer flange is provided at the rear end for retaining the ring in axial spaced relationship relative to the center bore of a wheel rim, and wherein a recessed groove is provided at the interior or outer surface at a distance from the front end, said groove being dimensioned and arranged for receipt of the flange or stepped portion of the resilient part of the center cap to thereby retain the center cap in concentric relationship with the centering ring, characterized in that
   the flexibly resilient part of the wheel center cap is formed by a plurality of flexibly resilient fingers extending substantially orthogonal from the rear side of the body portion, with each or at least part of the fingers having a free end with a flange or stepped portion, and in that the recessed groove of the hub centering ring is dimensioned and arranged for receipt of the flange or stepped portion of the fingers of the center cap to thereby retain the center cap in concentric relationship with the centering ring, and further characterized in that
   a wheel hub recess is formed in the interior surface at the rear end part of the interior surface of the centering ring, whereby the inner diameter of the centering ring is larger at the recessed rear end part than in the non-recessed middle part of the centering ring as a result of the relative thickness of the centering ring at the respective parts.

2. A combination according to claim 1, wherein the flange or stepped portion of the fingers of the wheel center cap is radially outwardly turned, and wherein the recessed groove is provided at the interior surface of the hub centering ring.

3. A combination according to claim 1, wherein the flange or stepped portion of the fingers of the wheel center cap is radially inwardly turned, and wherein the recessed groove is provided at the outer surface of the hub centering ring.

4. A combination according to claim 1, wherein the resilient fingers are circular arranged at the rear side of the body portion of the center cap, and wherein the recessed groove at the surface of the centering ring is a circular groove.

5. A combination according to claim 2, wherein
   the resilient fingers are circular arranged at the rear side of the body portion of the center cap;
   the recessed groove at the surface of the centering ring is a circular groove; and
   the outer diameter of the flange or stepped portion part of the center cap fingers is substantially equal to the diameter of the recessed groove of the centering ring.

6. A combination according to claim 3, wherein,
   the resilient fingers are circular arranged at the rear side of the body portion of the center cap;
   the recessed groove at the surface of the centering ring is a circular groove; and
   the inner diameter of the flange or stepped portion part of the center cap fingers is substantially equal to the diameter of the recessed groove of the centering ring.

7. A combination according to claim 1, wherein the lower part of the flange or stepped portion of the center cap fingers is provided at a first distance from the rear side of the body portion, and wherein the recessed groove of the centering ring has an upper edge or front edge provided at a second distance from the front end of the centering ring with the second distance being substantially equal to or smaller than the first distance.

8. A combination according to claim 1, wherein the body portion of the wheel center cap comprises a front side portion and a rear side portion with the fingers extending from the rear side portion, and wherein the front side portion is generally disc-like shaped with an outer diameter being larger that the outer diameter of the center cap fingers.

9. A combination according to claim 1, further comprising a wheel rim with a center bore, and wherein the front end part of the centering ring is projecting at the front of the wheel rim when the centering ring is arranged within the center bore with the retainer flange engaging the rear part of the wheel rim.

10. A combination according to claim 8, further comprising a wheel rim with a center bore, wherein,
- the front end part of the centering ring is projecting at the front of the wheel rim when the centering ring is arranged within the center bore with the retainer flange engaging the rear part of the wheel rim;
- the wheel rim has a number of bolt holes surrounding the center bore; and
- the outer diameter of the disc-like shaped front side portion of the center cap is larger than the diameter of a circle encompassing the outermost arranged bolt holes.

\* \* \* \* \*